United States Patent
Cobb et al.

(10) Patent No.: US 7,384,078 B2
(45) Date of Patent: Jun. 10, 2008

(54) NUT AND SEAT ASSEMBLY FOR CLAMP

(75) Inventors: Rodney Stuart Cobb, Croydon (GB); Anthony Elliott, Hampshire (GB)

(73) Assignee: Bio Pure Technology Limited, Havant, Hampshire (GB)

( * ) Notice: Subject to any disclaimer, the term of this patent is extended or adjusted under 35 U.S.C. 154(b) by 0 days.

(21) Appl. No.: 10/026,215

(22) Filed: Dec. 19, 2001

(65) Prior Publication Data

US 2002/0109355 A1    Aug. 15, 2002

Related U.S. Application Data

(63) Continuation of application No. PCT/GB00/04387, filed on Nov. 17, 2000.

(30) Foreign Application Priority Data

Nov. 17, 1999  (GB) ................................. 9927226.2

(51) Int. Cl.
    *F16L 25/00*  (2006.01)
(52) U.S. Cl. ........................... 285/420; 285/410; 24/279
(58) Field of Classification Search ................. 403/338, 403/334.2, 374.3, 373, 323, 14, 315, 316, 403/317, 321, 322.4; 285/148.28, 236, 253, 285/337, 364, 406, 410, 420, 415; 24/279
    See application file for complete search history.

(56) References Cited

U.S. PATENT DOCUMENTS

| 649,916 | A | * | 5/1900 | Dietrich ........................ 24/279 |
| 1,071,986 | A | * | 9/1913 | Cupper ......................... 24/279 |
| 2,689,141 | A | | 9/1954 | Kiekhaefer |
| 3,181,901 | A | * | 5/1965 | Watts ............................ 24/279 |
| 3,966,240 | A | | 6/1976 | Enomoto |
| 4,128,918 | A | * | 12/1978 | Wenk ............................ 24/16 R |
| 5,277,458 | A | * | 1/1994 | Tschann ....................... 285/411 |
| 5,653,481 | A | | 8/1997 | Alderman |
| 5,697,650 | A | * | 12/1997 | Brown .......................... 285/197 |
| 5,873,611 | A | * | 2/1999 | Munley et al. .............. 285/367 |
| 6,234,545 | B1 | * | 5/2001 | Babuder et al. ............. 285/364 |

FOREIGN PATENT DOCUMENTS

| EP | 0881337 A1 | 2/1998 |
| EP | 881337 A1 * | 12/1998 |
| GB | 2124289 A | 2/1984 |
| GB | 2274890 A | 8/1994 |

* cited by examiner

*Primary Examiner*—Aaron Dunwoody
(74) *Attorney, Agent, or Firm*—Alfred A. Fressola; Van Der Sluys & Adolphson LLP

(57) ABSTRACT

A nut and seat assembly is provided for a clamp. A nut is tightened onto a bolt and a clamp member has a seat for the nut and an aperture defined by prongs. The bolt is inserted laterally into the aperture and the nut is tightened axially against the set. Tightening the nut onto the seat prevents outward movement of the prongs away from the bolt as the nut holds the prongs in place.

27 Claims, 7 Drawing Sheets

Section A-A'

Section A-A'

NUT AND SEAT ASSEMBLY FOR CLAMP

This application is a continuation of International Application PCT/GB00/04376 filed on Nov. 17, 2000, which International Application was published by the International Bureau in English on May 25, 2001 and which International Application is based on GB application no. 9927226.2 filed on Nov. 17, 1999.

BACKGROUND OF THE INVENTION

The present invention relates to a nut and seat assembly for a clamp, to a clamp comprising that assembly and to methods of fastening articles such as pipe work using clamps.

A metal clamp is known for securely and hygienically attaching pipe work, typically for attachment of a flexible plastic outer hose onto a more rigid, inner metal pipe. Such clamps are in wide application, in particular in the food and hygiene industries, and as such these clamps need to comply with strict requirements for hygiene including integrity of clamping action and sealing between the pipes clamped.

The known clamp, made of metal, comprises upper, middle and lower clamping jaws, pivoted by a drilled pivot and using a connecting pin. This type of pivot is, however, rather expensive, especially in a mass-produced item such as the known clamp. Further, the clamp is made from a relatively large number of components, and it would be desirable to make a clamp with fewer components.

In use, the known clamp is opened and closed a number of times, and it is a further problem that it is easy for the bolt and/or the nut to become separated from other parts of the clamp. The clamp then has to be discarded because it is incomplete.

It would be desirable to be able to make this type of clamp in a plastics material, but the differing strengths of plastics versus metal mean that it is not possible to copy the metal clamp and simply make it out of plastic.

Lastly, the known metal clamp operates satisfactorily and there are no significant complaints about the clamp in use.

SUMMARY OF THE INVENTION

It is an object of the present invention to provide a clamp for sealing of pipe work, the clamp being made of plastics material. A further object of the present invention is to provide for improved operation of a clamp.

Accordingly, the present invention provides a nut and seat assembly for a clamp, comprising
 (i) a nut to be tightened onto a bolt; and
 (ii) a clamp member having a seat for the nut and an aperture defined by an opening between prongs so the bolt can be inserted laterally into the aperture and the nut can be tightened axially against the seat;
 wherein tightening of the nut onto the seat prevents outward movement of the prongs away from the bolt.

In one embodiment of the invention, projections on the seat cooperate with a recess in the nut, to prevent outward movement of the prongs. Alternatively, the recesses are on the seat and there is a projection or a number of projections on the nut. Thus, in use the nut and seat cooperate as the nut is tightened to hold the prongs of the seat and prevent them from being pushed outwards and in this context outward movement is prevented in that there is a limit to the movement and/or the movement is at least resisted.

Optionally, tightening of the nut onto the seat additionally pushes the prongs of the clamp member together and can tighten the prongs around the bolt, and this option has a further advantage in ensuring as tight as possible a union between the respective components, namely nut, bolt and clamp member.

In a preferred embodiment of the invention, the action of the nut and seat is obtained by combination of a mating surface at or towards a lower edge of the nut which cooperates with a corresponding mating surface on the seat, The nut is wound onto the bolt, with the bolt positioned between prongs of the second clamp member, and then as the nut is tightened onto the bolt action of the surfaces on each other prevents outward movement of the prongs and/or pushes the prongs together and tightens them around the bolt.

In a specific embodiment of the invention, described in detail below, a concave recess is provided on the nut and this cooperates with a convex portion on the seat and dimensioned so that tightening of the nut prevents splaying of the prongs, and preferably urges the prongs together.

A further embodiment provides respective projections and recesses on the upper and lower clamp members that are brought together by tightening of the nut. The interaction of these projections and recesses as the upper and lower clamp members are brought into contact resists outward movement of the prongs.

It is convenient for the seat of the second clamp member to comprise prongs which form a U-shaped aperture having an open side. In this way, a bolt can be inserted laterally into the open side of the aperture until it locates at the bottom of the U. The seat is formed from upper surfaces of the prongs. There is an advantage in this embodiment, in that the nut can be located on the end of the bolt when the clamp is open and it is not necessary for the nut to be removed from the bolt for the clamp to be closed, as the bolt can be moved laterally into the open side of the aperture and the nut then turned and axially tightened into the bolt, axial tightening of the nut drawing the second clamp member toward the first clamp member and exerting clamping action.

The nut may comprise wings for hand tightening in use and also a means for machine tightening the nut onto the bolt during manufacture of a clamp which incorporates the assembly, such as a hexagonal portion to engage with a driver on or associated with the manufacturing process. In a specific embodiment of the invention the components of the assembly are made of plastics material, and suitable plastics include polycarbonate, polyamides, polyoxymethylene (POM) and polysulphone. Generally, the plastic should be chosen so as to confer suitable strength to the clamp, including operational strength under hoop stress, as this stress is present in use of the clamp around a pipe. The plastic preferably resist water ingress. Good tensile strength is also preferred and the plastic is generally an engineering polymer rather than a commodity plastic. It is preferably moldable and typically glass filled to add rigidity and ensure thick sections of components do not sink during the molding process and to maintain integrity of the components. A fill level of from 30 to 40 percent is particularly suitable.

A second aspect of the invention provides a method of securing a clamp around a pipe, comprising:
 locating an upper clamp member over the pipe;
 locating a lower clamp member under the pipe, respective first ends of the clamp members being connected, optionally via a pivot, and a bolt being attached to the second end of one of the clamp members; and
 tightening a nut onto the bolt so the nut engages with a seat on the second end of the other clamp member so as to close the clamp;

wherein the seat comprises prongs forming an open-sided aperture for the bolt; and tightening the nut prevents outward movement of the prongs away from the bolt.

Preferably, tightening the nut onto the bolt causes movement of the prongs inwards and tightens the prongs around the bolt.

A third aspect of the invention lies in a clamp, for clamping pipework, comprising:
a first clamp member;
a second clamp member;
a bolt; and
a nut
such that when the first clamp member is attached to the second clamp member and the bolt is attached to the first clamp member the nut can be tightened onto the bolt so as to clamp pipework between the first and second clamp members,
wherein the second clamp member comprises an aperture defined by prongs and into which the bolt can be moved laterally, and tightening of the nut onto the second clamp member prevents splaying of the prongs.

In an embodiment of the invention shown in an example below, tightening of the nut onto a seat of the prongs of the second clamp member exerts an inward force on the prongs, towards the bolt. This confers the additional advantage of further holding together the nut and seat components of the clamp and ensuring integrity of clamping action in use.

A suitable second clamp member comprises an open-sided, U-shaped aperture defined by prongs and in use the bolt can be moved laterally in and out of the aperture and the nut is tightened axially onto the bolt. Further, the first and second clamp members can be pivotally connected at respective first ends.

The bolt is typically separate from the first clamp member and comprises a retention means and the first clamp member comprises an aperture through which the bolt passes such that when the bolt has been passed through the aperture removal of the bolt from the first clamp member is resisted by the retention means. Thus, there is the advantage that once assembled it is unlikely in use that the bolt become separated from the first clamp member.

An example of a retention means comprises a resilient, angled projection so the bolt can easily be inserted into the aperture but is more difficult to remove once inserted. An example of a bolt comprises a T-shaped end portion to engage against the first clamp member in use and to act as a pivot for pivotal movement of the bolt relative to the first clamp member. At the end that receives the nut the bolt can comprise a non-threaded portion to facilitate location of the nut onto the bolt.

In a specific embodiment of the invention described in more detail below, the first and second clamp members are separate but pivotally engaged to each other and wherein one of the first and second members comprises a resilient retention means and the other comprises a surface against which acts the retention means, and wherein it is easy to snap the first and second members into pivotal engagement but more difficult to disengage the first and second clamp members thereafter. Thus once assembled it is unlikely in use that the first and second clamp members are detached from each other. The clamp is also made of plastics material.

Another embodiment of the third aspect of the invention provides a pipe clamp comprising at least first and second parts having a pivotal connection to allow the parts to be opened for receiving a pipe, and a nut and bolt which can be tightened to secure the clamp on the pipe, one of said parts having a bifurcation at one end through which the bolt passes, said end having means which engage with the nut when it is tightened on the bolt so as to limit opening of the bifurcation.

Preferably, a concave recess cooperates with a convex portion or portions dimensioned so that tightening the bolt urges the bifurcation together. The concave recess is suitably provided on an inside surface of the nut and the convex portion or portions are suitably provided on the end of the part through which the bolt passes.

A further aspect of the invention lies in a clamp, having an upper member and a lower member to go around a pipe, a nut and a bolt, wherein the bolt is separate from the lower clamp member and comprises a retention means and the lower clamp member comprises an aperture through which the bolt passes such that when the bolt has been passed through the aperture removal of the bolt from the lower clamp member is resisted by the retention means, and wherein the first and second clamp members are separate but pivotally engageable to each other and wherein one of the first and second members comprises a resilient retention means and the other comprises a surface against which acts the retention means, and wherein it is easy to snap the first and second members into pivotal engagement but more difficult to disengage the first and second clamp members thereafter.

Optional and preferred features of the first to third aspects of the invention may also be incorporated into a clamp of the fourth aspect.

There now follows a description of a specific embodiment of the present invention, accompanied by drawings in which:

BRIEF DESCRIPTION OF DRAWING

FIGS. 7a-7d show side, further side, top and bottom views of a nut for a clamp of the invention.

DETAILED DESCRIPTION OF THE INVENTION

Figure 1A:
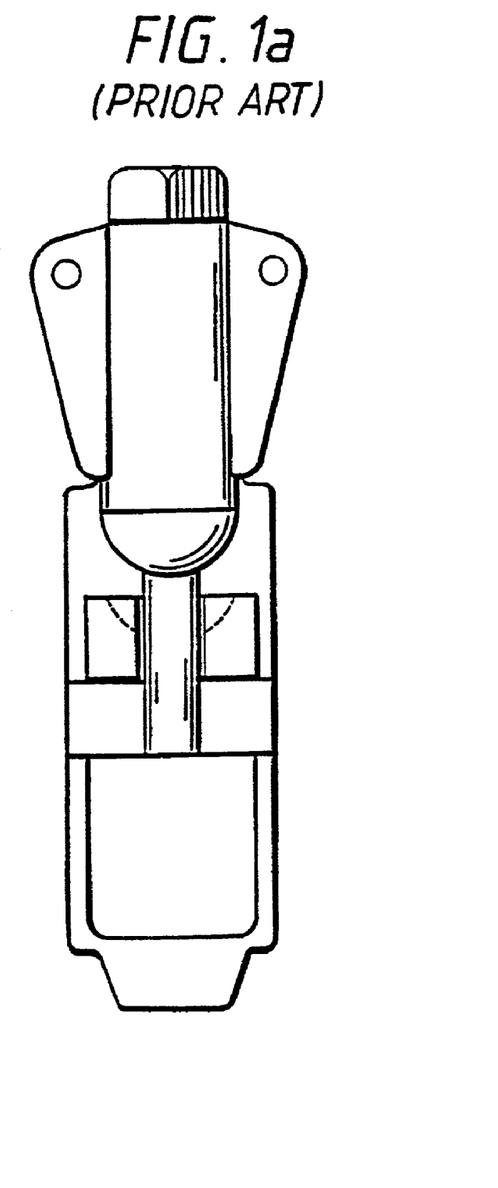
FIGS. 1a and 1b show schematic end views of a prior art clamp and a clamp of the invention, respectively.
Figure 1B:
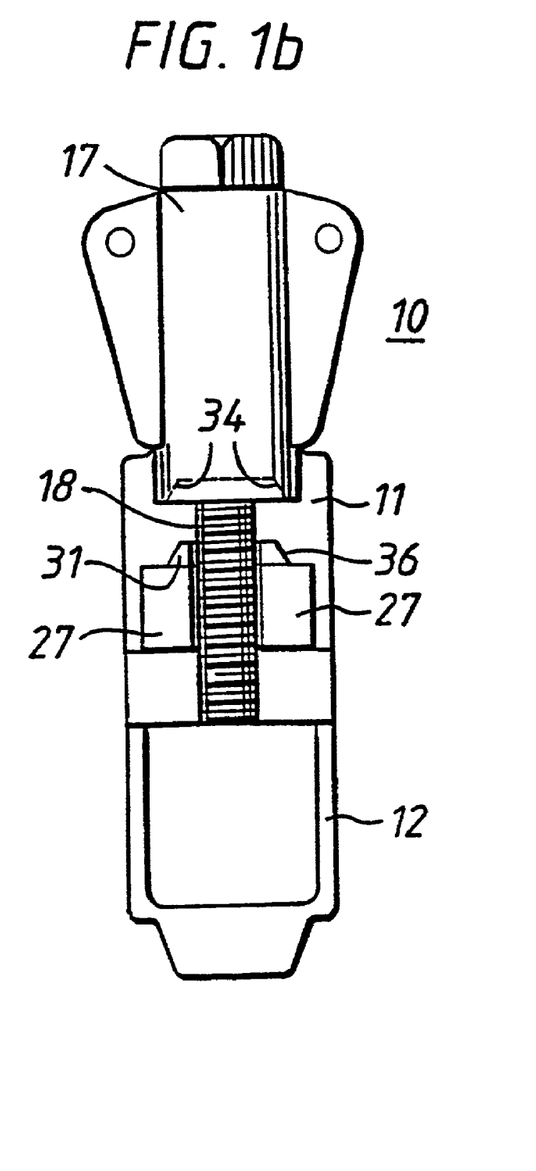
Figure 2A:
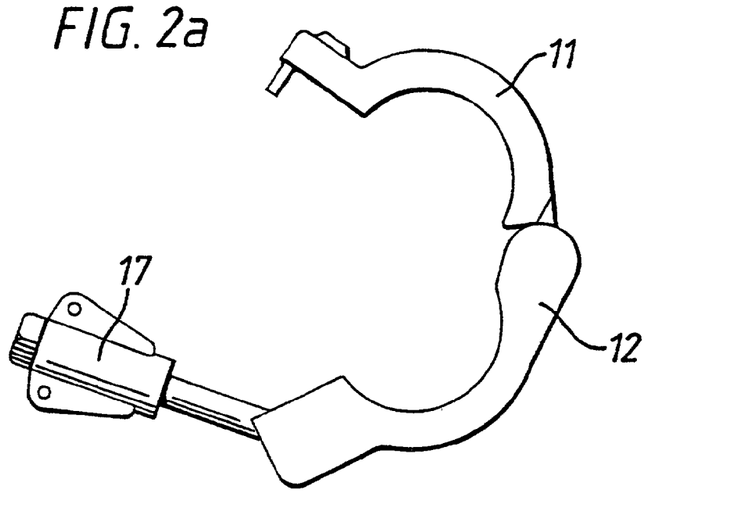
FIGS. 2a-2c show side views illustrating operation of a clamp of the invention.
Figure 2B:
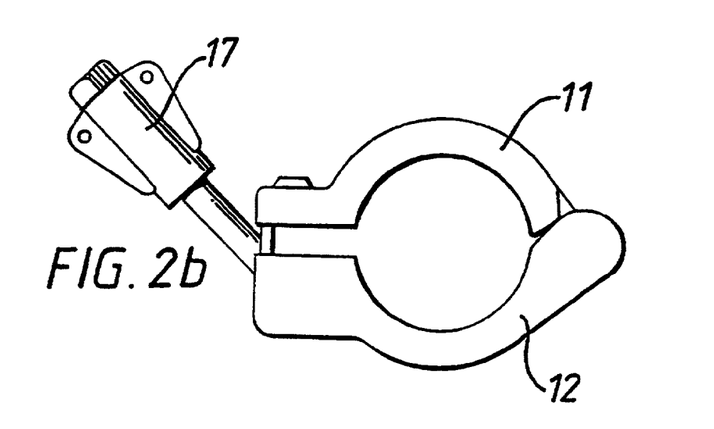
Figure 2C:
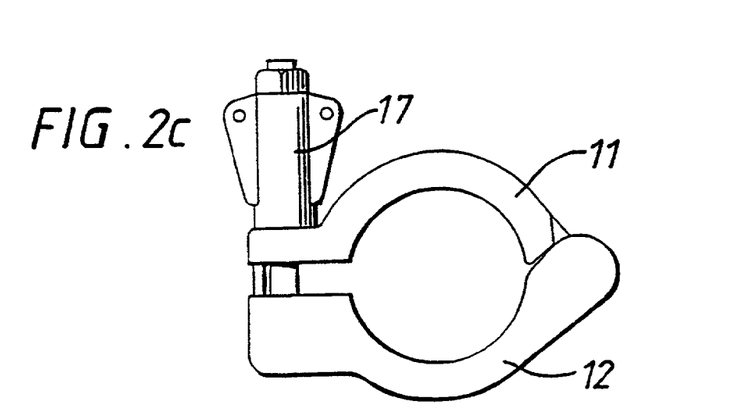
Figure 3A:
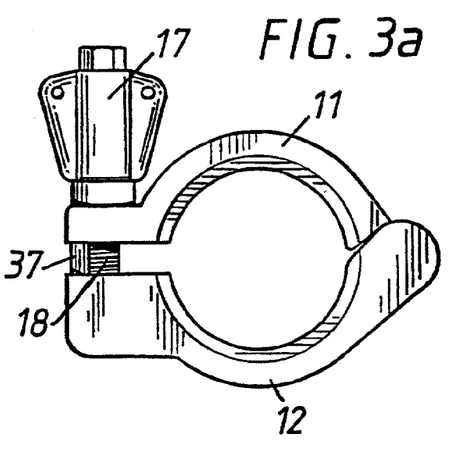
FIGS. 3a-3e show side, bottom, top, rear, and front views of a clamp of the invention.
Figure 3B:
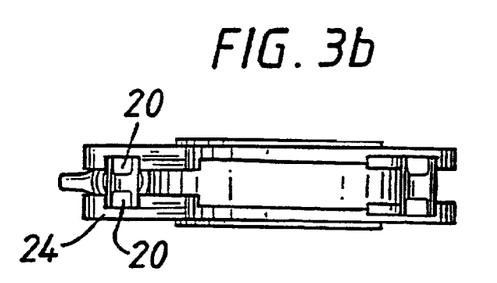
Figure 3C:
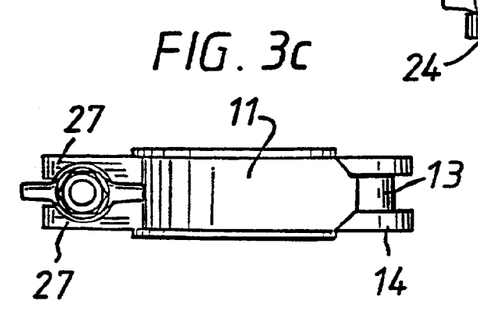
Figure 3D:
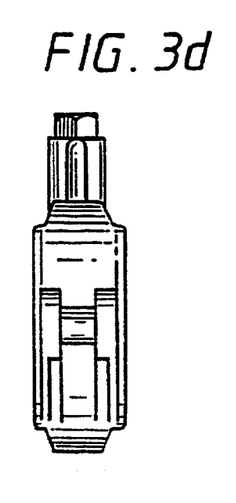
Figure 3E:
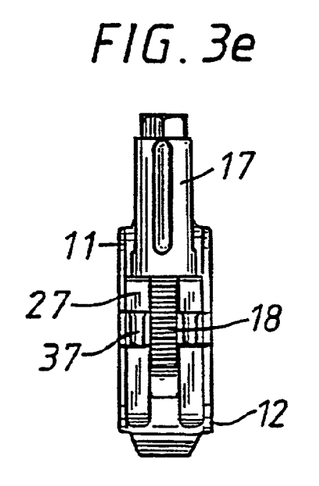
Figure 4A:
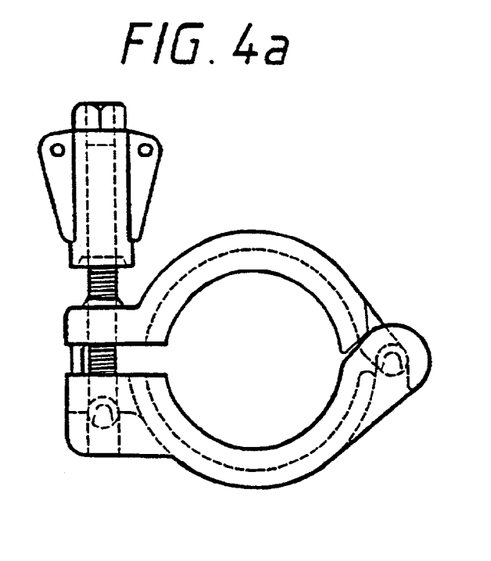
FIGS. 4a-4f show side, front, rear (without nut) views and three views illustrating assembly of a clamp of the invention.
Figure 4B:
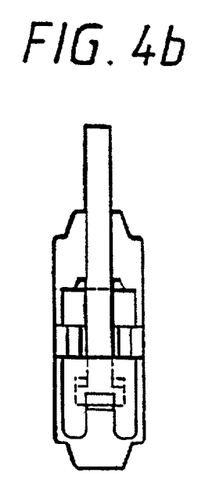
Figure 4C:
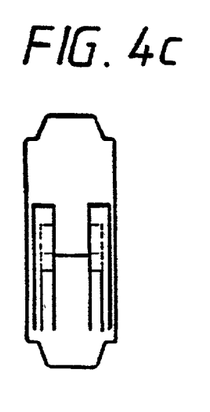
Figure 4D:
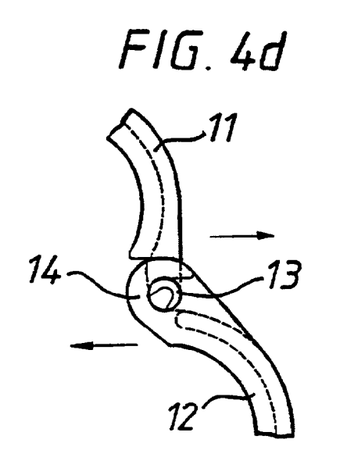
Figure 4E:
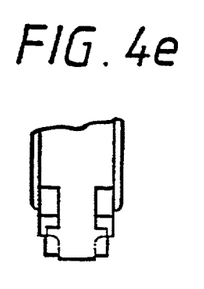
Figure 4F:
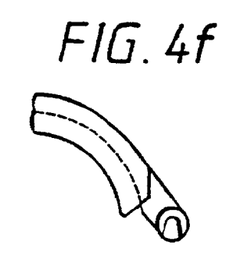
Figure 5A:
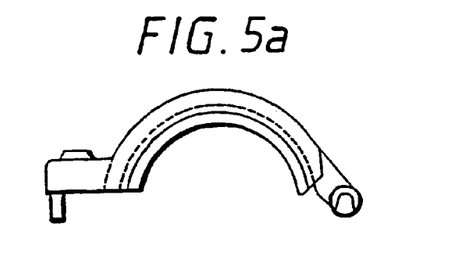
FIGS. 5a-5f show side, bottom, top, front, rear and sectional views of an upper member of a clamp of the invention.
Figure 5B:
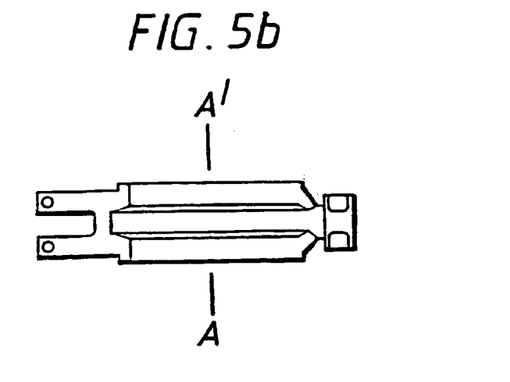
Figure 5C:
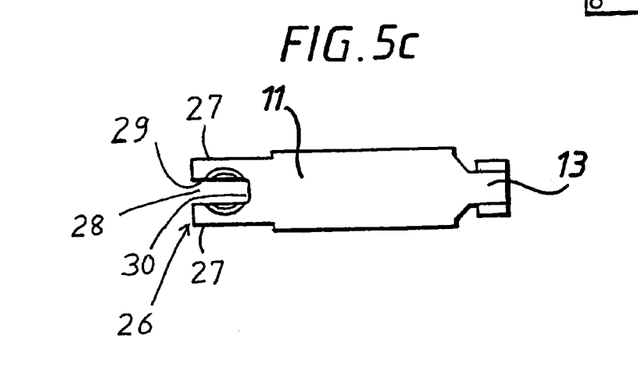
Figure 5D:
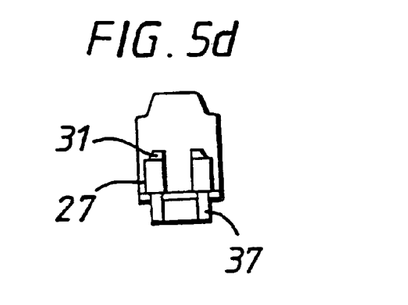
Figure 5E:
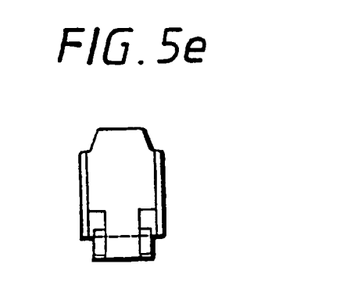
Figure 5F:
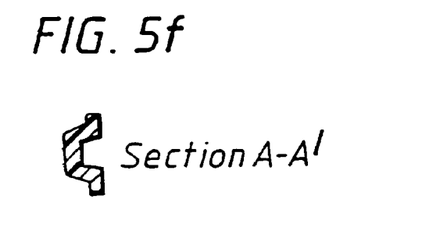
Figure 6A:
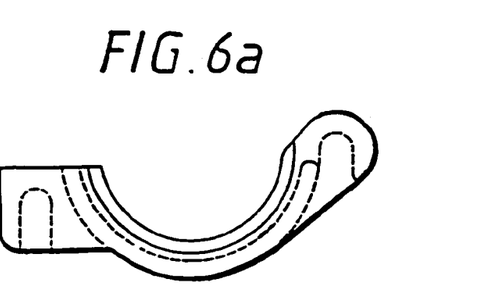
FIGS. 6a-6e show side, top, front, rear and sectional views of a lower member of a clamp on the invention.
Figure 6B:
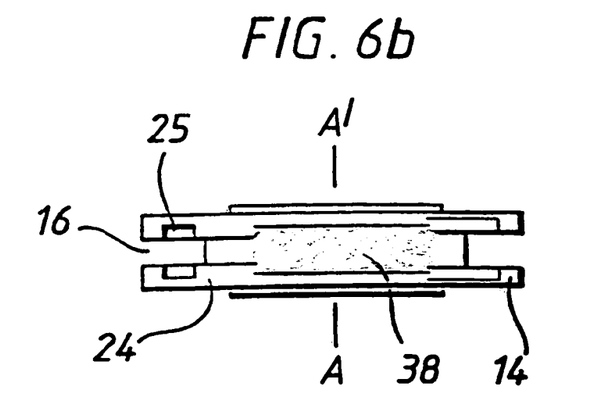
Figure 6C:
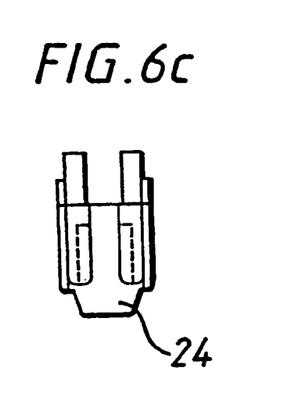
Figure 6D:
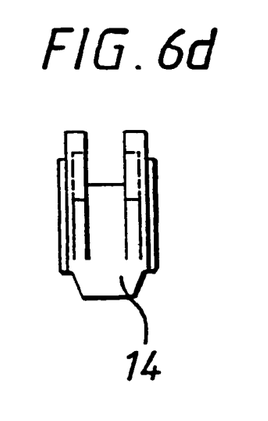
Figure 6E:
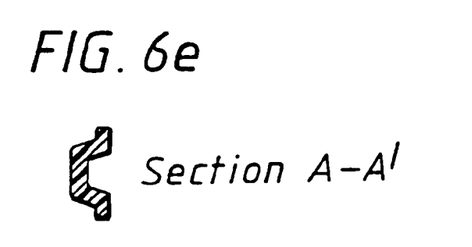
Figure 7A:
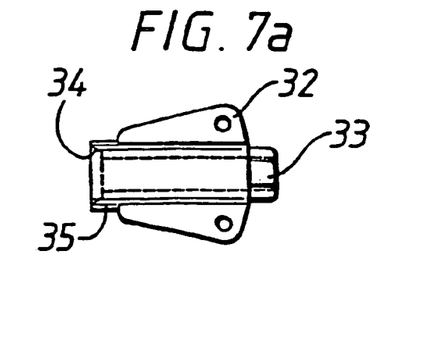
Figure 7B:
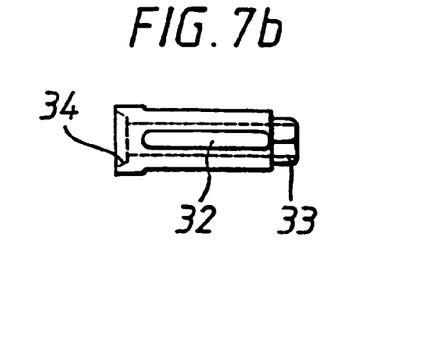
Figure 7D:
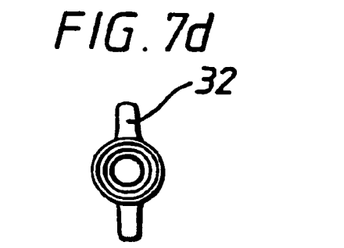
Figure 8A:
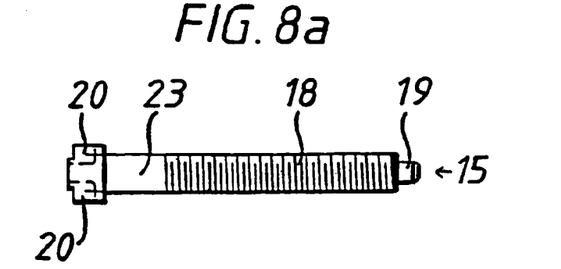
FIGS. 8a-8d show front, side, top and bottom views of a bolt for a clamp of the invention.
Figure 8B:
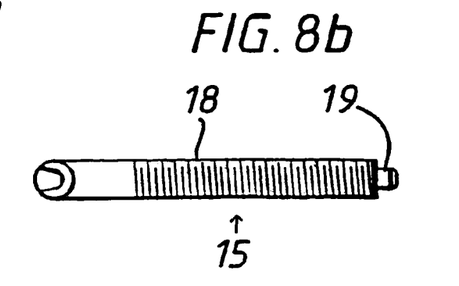
Figure 8C:
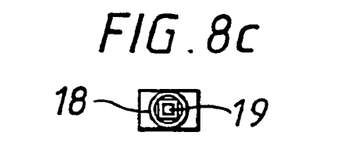
Figure 8D:
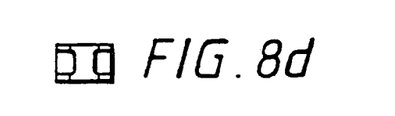

A known pipe claim is shown is FIG. 1a.

Referring to FIGS. 1b and 2-8, a clamp according to a preferred embodiment of the invention is shown generally as 10 and comprises upper clamp member 11 and lower clamp number 12 pivotally connected by respective pivot portions 13 and 14 of the upper and lower members. Bolt 15 passes through aperture 16 in the lower clamp member 12 and nut 17 is tightened onto bolt 15 to close the upper and lower clamp members around pipe work (not shown).

Referring specifically to bolt 15, the bolt comprises a threaded portion 18 to engage the nut and has an end portion 19 of reduced diameter, designed to ease location of a nut onto the bolt. The end portion 19 is square in cross section, with a circle defined by the apices of the square being of a diameter that is the same as or slightly less than the diameter of the inside of the nut. In addition, this end portion facilitates ejection of the bolt from a mold during the manufacturing process.

The other end of the bolt includes shoulders 20 which engage with the lower clamp member and allow the bolt to pivot whilst engaged with the lower clamp member. A retention lug (not shown) optionally projects from the shaft 23 of the bolt such that once the bolt has been inserted through aperture 16 in the lower clamp member it is difficult to remove the bolt from the lower clamp member.

Referring to the detail of the end of the lower clamp member 12, the end portion 24 comprises aperture 16 to which the bolt is inserted. The aperture 16 is oblong and allows the bolt to pivot with shoulders 20 engaging bolt seats 25. It is also an option for the aperture to be substantially circular.

Referring to the detail of the end of the upper clamp member, end portion 26 comprises prongs 27 which define a substantially U-shaped aperture 28 which has an open side 29 and a closed side 30. The end portion 26 also comprises projections 31 which cooperate with the nut as is described below.

The nut 17 comprises wings 32 for hand-tightening, and hexagonal end 33 which is used for machine assembly of the nut onto the bolt. Lower portion 35 of the nut comprises inner, angled surface 34. In use, as the nut is tightened onto the bolt, the bolt being located within aperture 28 of the upper clamp member, surfaces 34 engage with projections 31, and cooperate with corresponding angled surfaces 36 on those projections, such that further tightening of the nut exerts a force inwardly, to prevent outward splaying of prongs 27 and to tighten prongs 27 around the bolt 15. Further projections 37 extend from the prongs 27 and prevent overdosing of the clamp.

With reference to FIGS. 4a and 4d-4f, a clamp of the invention is shown illustrating the pivotal connection between the ends 13 and 14 of the upper and lower members. The ends are formed such that projections on the end of the upper member cooperate with an angled groove on the inner surface of the lower member. The orientation of the groove in the lower member is such that the upper member can easily be inserted, and this can be a "snap-fit" and removed when the clamp is fully open, but the two members are locked together when the clamp is closed or partially open.

The lower member of the clamp may optionally include a section 38 into which an insert bearing a logo or some other form of identification can be placed. This section of the lower member is preferably made of a clear plastic so that the logo insert is visible when the clamp is closed.

The invention thus provide a nut and seat assembly for a clamp, a clamp and a method of clamping articles such as pipes.

The invention claimed is:

1. A pipe clamp made of plastics material comprising at least first and second parts having a pivotal connection to allow said at least first and second parts to be opened for receiving a pipe, and a nut and bolt which can be tightened to secure the clamp on the pipe, one of said parts having ends and having a bifurcation at one end through which the bolt passes, wherein projections are provided on the bifurcation and corresponding indentations are provided in the nut so as to mate the bifurcation to the nut when the nut and bolt are tightened.

2. A clamp, made of plastics material, for clamping pipework, comprising:
   a first clamp member;
   a second clamp member;
   a bolt; and
   a nut such that when the first clamp member is attached to the second clamp member and the bolt is attached to the first clamp member the nut can be tightened onto the bolt so as to clamp pipework between the first and second clamp members, wherein the second clamp member comprises an aperture defined by prongs and into which the bolt can be moved laterally, the nut mates directly in contact with a seat integrally formed on the second clamp member and tightening of the nut onto the second clamp member prevents splaying of the prongs, wherein projections are provided on the seat and corresponding indentations are provided in the nut so as to mate the prongs to the nut when the nut and bolt are tightened.

3. The clamp of claim 2, wherein tightening of the nut onto the second clamp member exerts an inward force on the prongs, towards the bolt.

4. The clamp of claim 2, wherein the second clamp member comprises an open-sided, U-shaped aperture defined by prongs and in use the bolt can be moved laterally in and out of the aperture and the nut is tightened axially onto the bolt.

5. The claim of claim 2, wherein the first and second clamp members are pivotally connected at respective first ends.

6. The clamp of claim 2, wherein the bolt is separate from the first clamp member and comprises a retention means and the first clamp member comprises an aperture through which the bolt passes such that when the bolt has been passed through the aperture removal of the bolt from the first clamp member is resisted by the retention means.

7. The clamp of claim 6, wherein the retention means comprises a resilient, angled projection so the bolt can easily be inserted into the aperture but is more difficult to remove once inserted.

8. The clamp of claim 2, wherein the bolt comprises a T-shaped end portion to engage against the first clamp member in use and to act as a pivot for pivotal movement of the bolt relative to the first clamp member.

9. The clamp of claim 2, wherein at the end that receives the nut the bolt comprises a non-threaded portion to facilitate location of the nut onto the bolt.

10. The clamp of claim 2, wherein the first and second clamp members are separate but pivotally engaged directly to each other in a snap-fit relation and wherein one of the first and second members comprises a resilient retention means and the other comprises a surface against which acts the retention means, and wherein it is easy to snap the first and second members into pivotal engagement but more difficult to disengage the first and second clamp members thereafter.

11. The clamp of claim 2, wherein the plastics material is glass-filled nylon.

12. The clamp of claim 2, wherein further projections extend from the prongs and prevent overclosing of the clamp.

13. A nut and seat assembly for a clamp made of plastics material, comprising
   (i) a nut to be tightened onto a bolt; and
   (ii) a clamp member having a seat integrally formed thereon for the nut and an aperture defined by prongs so the bolt can be inserted laterally into the aperture and the nut can be tightened axially against the seat;
   wherein the nut and seat mate directly in contact with each other and tightening of the nut onto the seat prevents outward movement of the prongs away from the bolts, wherein projections are provided on the seat and corresponding indentations are provided in the nut so as to mate the prongs to the nut when the nut and bolt are tightened.

14. The assembly of claim 13, wherein tightening of the nut onto the seat pushes the prongs of the clamp member together and can tighten the prongs around the bolt.

15. The assembly of claim 13, wherein prongs of the clamp member form a U-shaped aperture such that in use a bolt can be inserted laterally into the open end of the aperture and the seat is formed from the sides of the prongs.

16. The assembly of claim 13, wherein the plastics material is glass-filled nylon.

17. The assembly of claim 13, wherein further projections extend from the prongs and prevent overclosing of the clamp.

18. A clamp, having an upper member and lower member, to go around a pipe, a nut and a bolt,
wherein the bolt is separate from the lower clamp member and comprises a retention means and the lower clamp member comprises an aperture through which the bolt passes such that when the bolt has been passed through the aperture removal of the bolt from the lower clamp member is resisted by the retention means, and
wherein the first and second clamp members are separate but pivotally engaged directly to each other in a snap-fit relation and wherein one of the first and second members comprises a resilient retention means and the other comprises a surface against which acts the retention means, and wherein it is easy to snap the first and second members into pivotal engagement but more difficult to disengage the first and second clamp members thereafter.

19. A pipe clamp made of plastics material, comprising a first part and a second part, each having first and second ends, wherein the first ends of each of said first and second parts are pivotally connected to allow the first and second parts to be opened for receiving a pipe, and a nut and bolt which can be tightened to secure the clamp on the pipe, the second end of one of said first and second parts having a bifurcation through which the bolt passes, wherein the second end having the bifurcation engages with the nut when it is tightened on the bolt so as to limit opening of the bifurcation, and wherein further projections extend from the second end of one of said first and second parts and prevent overclosing of the clamp.

20. A nut and seat assembly made of plastics material for a clamp made of plastics material, comprising
(i) a nut to be tightened onto a bolt; and
(ii) a clamp member having a seat integrally formed thereon for the nut and an aperture defined by prongs so the bolt can be inserted laterally into the aperture and the nut can be tightened axially against the seat;
wherein tightening of the nut onto the seat prevents outward movement of the prongs away from the bolt; and wherein projections are provided on the seat and corresponding indentations are provided in the nut so as to mate the prongs to the nut when the nut and bolt are tightened.

21. A clamp made of plastics material, for clamping pipework, comprising:
a first clamp member;
a second clamp member;
a bolt; and
a nut
such that when the first clamp member is attached to the second clamp member and the bolt is attached to the first clamp member the nut can be tightened onto the bolt so as to clamp pipework between the first and second clamp members,
wherein the second clamp member comprises an aperture defined by prongs and into which the bolt can be moved laterally, and tightening of the nut onto the second clamp member directly in contact therewith prevents splaying of the prongs; and wherein projections are provided on the seat and corresponding indentations are provided in the nut so as to mate the prongs to the nut when the nut and bolt are tightened.

22. A method of securing a clamp made of plastics material around a pipe, comprising:
locating an upper clamp member over the pipe;
locating a lower clamp member under the pipe, respective first ends of the clamp members being connected, optionally via a pivot, and a bolt being attached to the second end of one of the clamp members; and
tightening a nut onto the bolt so the nut engages with a seat on the second end of the other clamp member so as to close the clamp;
wherein the seat comprises prongs forming an open-sided aperture for the bolt and tightening the nut prevents outward movement of the prongs away from the bolt;
tightening the nut onto the bolt so as to move the prongs inwards and tighten the prongs around the bolt; and wherein projections are provided on the seat and corresponding indentations are provided in the nut so as to mate the prongs to the nut when the nut and bolt are tightened.

23. A pipe clamp made of plastics material comprising at least first and second parts having a pivotal connection to allow the said at least first and second parts to be opened for receiving a pipe, and a nut and bolt which can be tightened to secure the clamp on the pipe, one of said parts having ends and having a bifurcation at one end through which the bolt passes, wherein said end mates directly with the nut when it is tightened on the bolt so as to limit opening of the bifurcation, and wherein a concave recess provided on an inside surface of the nut cooperates with a convex portion or portions on the end of the part through which the bolt passes so that tightening the bolt urges the bifurcation together.

24. A nut and seat assembly for a clamp made of plastics material, comprising
(i) a nut to be tightened onto a bolt; and
(ii) a clamp member having a seat for the nut and an aperture defined by prongs so the bolt can be inserted laterally into the aperture and the nut can be tightened axially against the seat;
wherein the nut and seat mate directly and tightening of the nut onto the seat prevents outward movement of the prongs away from the bolt; and
wherein the nut comprises indentations at or towards a lower edge of the nut which co-operates with corresponding projections on the seat so that as the nut is tightened onto the bolt action of the surfaces on each other prevents outward movement of the prongs and pushes the prongs together and tightens them around the bolt.

25. A nut and seat assembly for a clamp made of plastics material, comprising
(i) a nut to be tightened onto a bolt; and
(ii) a clamp member having a seat for the nut and an aperture defined by prongs so the bolt can be inserted laterally into the aperture and the nut can be tightened axially against the seat;
wherein the nut and seat mate directly and tightening of the nut onto the seat prevents outward movement of the prongs away from the bolt; and
wherein the nut comprises indentations at or towards a lower edge of the nut which co-operates with corresponding projections on the seat so that as the nut is tightened onto the bolt action of the surfaces on each other prevents outward movement of the prongs.

26. The clamp of claim 2, wherein said first clamp member comprises a cross-member for limiting pivotal movement of said bolt relative to said first clamp member.

27. The clamp of claim 21, wherein said first clamp member comprises a cross-member for limiting pivotal movement of said bolt relative to said first clamp member.

* * * * *

UNITED STATES PATENT AND TRADEMARK OFFICE
CERTIFICATE OF CORRECTION

PATENT NO. : 7,384,078 B2  Page 1 of 1
APPLICATION NO. : 10/026215
DATED : June 10, 2008
INVENTOR(S) : Cobb et al.

It is certified that error appears in the above-identified patent and that said Letters Patent is hereby corrected as shown below:

Column 6, line 21, claim 5, line 1, please delete the word "claim" and insert --clamp-- therefor.

Column 6, line 63, claim 13, line 10, please delete the word "bolts" and insert --bolt-- therefor.

Signed and Sealed this

Twenty-sixth Day of August, 2008

JON W. DUDAS
*Director of the United States Patent and Trademark Office*